(12) United States Patent
Murillo-Maese

(10) Patent No.: US 10,751,978 B2
(45) Date of Patent: Aug. 25, 2020

(54) SELF-ADHESIVE FLEXIBLE MEMBRANE

(71) Applicant: Firestone Building Products Company, LLC, Indianapolis, IN (US)

(72) Inventor: Rodrigo Murillo-Maese, Noblesville, IN (US)

(73) Assignee: Firestone Building Products Company, LLC, Indianapolis, IN (US)

( * ) Notice: Subject to any disclaimer, the term of this patent is extended or adjusted under 35 U.S.C. 154(b) by 169 days.

(21) Appl. No.: 15/146,237

(22) Filed: May 4, 2016

(65) Prior Publication Data

US 2016/0325539 A1 Nov. 10, 2016

Related U.S. Application Data

(60) Provisional application No. 62/156,363, filed on May 4, 2015.

(51) Int. Cl.
| | |
|---|---|
| B32B 27/32 | (2006.01) |
| B32B 3/02 | (2006.01) |
| B32B 7/12 | (2006.01) |
| E04D 5/14 | (2006.01) |
| E04D 5/12 | (2006.01) |
| C09J 7/40 | (2018.01) |

(52) U.S. Cl.
CPC ............... *B32B 27/32* (2013.01); *B32B 3/02* (2013.01); *B32B 7/12* (2013.01); *C09J 7/40* (2018.01); *E04D 5/12* (2013.01); *E04D 5/148* (2013.01); *C09J 2201/122* (2013.01); *C09J 2201/606* (2013.01); *C09J 2423/006* (2013.01); *C09J 2423/166* (2013.01)

(58) Field of Classification Search
CPC .. B32B 27/32; B32B 3/02; B32B 7/12; E04D 5/148; E04D 5/12; C09J 7/0225; C09J 2423/166; C09J 2423/006; C09J 2201/606; C09J 2201/122
See application file for complete search history.

(56) References Cited

U.S. PATENT DOCUMENTS

| | | | | |
|---|---|---|---|---|
| 3,874,418 | A * | 4/1975 | Hielema | B29C 63/10 138/144 |
| 4,917,928 | A * | 4/1990 | Heinecke | A61F 13/023 428/124 |
| 6,901,712 | B2 * | 6/2005 | Lionel | E04D 12/002 52/408 |
| 7,331,348 | B1 * | 2/2008 | Beevers | A61M 16/0666 128/200.26 |
| 7,666,491 | B2 * | 2/2010 | Yang | C08J 5/2231 428/141 |
| 2003/0017294 | A1 * | 1/2003 | MacDonell | B32B 3/14 428/42.2 |

(Continued)

*Primary Examiner* — Laura C Powers
(74) *Attorney, Agent, or Firm* — Brian D. McAlhaney; Todd Taylor

(57) ABSTRACT

A self-adhesive membrane includes a substrate with a bottom surface and a first edge; an adhesive substance at least partially covering the bottom surface, the adhesive substance covering an area of the bottom surface adjacent to the first edge; a first liner partially covering the adhesive substance, the first liner covering the area of the adhesive substance adjacent to the first edge; and a second liner covering another area of the adhesive substance not covered by the first liner, the second liner and the first liner being independently separable from the adhesive substance.

10 Claims, 5 Drawing Sheets

(56) References Cited

U.S. PATENT DOCUMENTS

| | | | |
|---|---|---|---|
| 2004/0220505 A1* | 11/2004 | Worthley | A61M 25/02 |
| | | | 602/54 |
| 2007/0003728 A1* | 1/2007 | Hannon | A41D 15/005 |
| | | | 428/57 |
| 2008/0141597 A1* | 6/2008 | O'Rourke | E06B 1/62 |
| | | | 52/62 |
| 2012/0238932 A1* | 9/2012 | Atteia | A61F 13/0276 |
| | | | 602/52 |

* cited by examiner

SELF-ADHESIVE FLEXIBLE MEMBRANE

CROSS REFERENCE TO RELATED APPLICATIONS

This is a non-provisional application based upon U.S. provisional patent application Ser. No. 62/156,363, entitled "SELF-ADHERING FLEXIBLE MEMBRANE", filed May 4, 2015, which is incorporated herein by reference.

BACKGROUND OF THE INVENTION

1. Field of the Invention

The present invention relates to membranes, and, more particularly, to flexible membranes for building surfaces.

2. Description of the Related Art

Flexible membranes are known that can be adhered to a surface of a building, such as its roof, to cover the surface. Since it is undesirable to produce openings in the membrane that liquid can flow into, the membranes are often adhered to the surface using an adhesive. Typical adhesives are applied to the surface in an uncured or sticky state, and will spontaneously cure with exposure to air or stick to contacted objects. One problem with known ways to install flexible membranes to building surfaces is that the adhesive must be applied to the surface before adhering the membrane, which can be a time-consuming step. Further, there is a short time-frame between applying the adhesive and adhering the membrane to the adhesive before the adhesive cures or adheres undesirable objects to the surface. This shortened time frame can result in the membrane being applied hastily and improperly.

What is needed in the art is a method to adhere a flexible membrane to a surface that overcomes some of the disadvantages of known methods.

SUMMARY OF THE INVENTION

The present invention provides a self-adhesive flexible membrane that has an adhesive substance placed on a surface of the membrane and two liners covering the adhesive substance that are independently removable.

The invention in one form is directed to a self-adhesive membrane including a substrate with a bottom surface and a first edge; an adhesive substance at least partially covering the bottom surface, the adhesive substance covering an area of the bottom surface adjacent to the first edge; a first liner partially covering the adhesive substance, the first liner covering the area of the adhesive substance adjacent to the first edge; and a second liner covering another area of the adhesive substance not covered by the first liner, the second liner and the first liner being independently separable from the adhesive substance.

The invention in another form is directed to a method of adhering a membrane to a surface. An adhesive membrane is provided which includes a substrate having a bottom surface and a first edge; an adhesive substance at least partially covering the bottom surface, the adhesive substance covering an area of the bottom surface adjacent to the first edge; a first liner partially covering the adhesive substance, the first liner covering the area of the adhesive substance adjacent to the first edge; and a second liner covering another area of the adhesive substance not covered by the first liner, the second liner and the first liner being independently separable from the adhesive substance. The first liner is separated from the adhesive substance to expose a first previously-covered adhesive substance and the first previously-covered adhesive substance is pressed on the surface. The second liner is separated from the adhesive substance to expose a second previously-covered adhesive substance; and the second previously-covered adhesive substance is pressed on the surface.

The invention in yet another form is directed to a method of adhering a membrane to a surface. An adhesive membrane is provided which includes a substrate having a bottom surface and a first edge; an adhesive substance at least partially covering the bottom surface, the adhesive substance covering an area of the bottom surface adjacent to the first edge; a first liner partially covering the adhesive substance, the first liner covering the area of the adhesive substance adjacent to the first edge; and a second liner covering another area of the adhesive substance not covered by the first liner, the second liner and the first liner being independently separable from the adhesive substance. The first liner is separated from the adhesive substance to expose a first previously-covered adhesive substance and the first previously-covered adhesive substance is anchored on the surface. The second liner is pulled in a direction away from the anchored first previously-covered adhesive substance to simultaneously expose a second previously-covered adhesive substance and press the second previously-covered adhesive substance on the surface.

An advantage of the present invention is the adhesive membrane can be easily adhered on a building surface before the adhesive substance is rendered ineffective.

Another advantage of the present invention is anchoring part of the membrane prior to fully adhering the membrane allows for the final positioning of the membrane to be consistently accurate.

BRIEF DESCRIPTION OF THE DRAWINGS

The above-mentioned and other features and advantages of this invention, and the manner of attaining them, will become more apparent and the invention will be better understood by reference to the following description of embodiments of the invention taken in conjunction with the accompanying drawings, wherein.

Corresponding reference characters indicate corresponding parts throughout the several views. The exemplifications set out herein illustrate embodiments of the invention and such exemplifications are not to be construed as limiting the scope of the invention in any manner.

DETAILED DESCRIPTION OF THE INVENTION

Figure 1A:
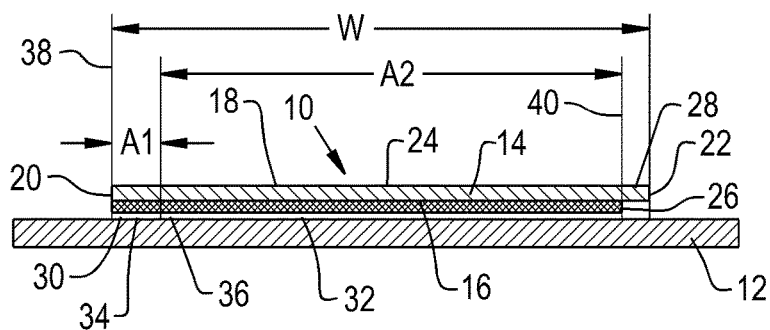
FIG. 1A is an illustration of a step of an embodiment of a method according to the present invention for adhering a flexible membrane to a surface.

Referring now to FIGS. 1A, 1B, 1C, 1D, 1E, 1F, 2A, 2B, 2C, 2D, 2E, and 2F, there is shown an embodiment of a self-adhesive membrane 10 according to the present invention placed on a surface 12. The membrane 10 generally includes a substrate 14 with a bottom surface 16, a top surface 18, and multiple edges 20, 22, 24 defining a perimeter of the substrate 14. The substrate 14 can be formed of a flexible material such as a polymer or a rubber that will provide a water-resistant covering for the surface 12. Example materials that are commonly used to form substrates for roof covering membranes include thermoplastic polyolefin (TPO) and ethylene propylene diene terpolymer (EPDM). The substrate 14 has a width W extending from edge 20 to edge 22, with edge 24 being an edge of the substrate 14 at a longitudinal end of the substrate 14. The dimensions and shape of the substrate 14 can be altered, as desired, to cover all or part of the surface 12, and it should be understood that all references to top, bottom, width, length, and thickness are used solely for ease of description and not to limit the scope of the present invention to any particular embodiment.

An adhesive substance 26 is placed on the bottom surface 16 of the substrate 14 to cover part of the bottom surface 16. The adhesive substance 26 can be, for example, a glue or other substance that is sticky and/or spontaneously cures when exposed to air, moisture, or a curing agent that can be applied to the surface 12. The adhesive substance 26, when placed on the surface 12, therefore adheres the substrate 10 to the surface 12. As shown, the adhesive substance 26 is applied to the bottom surface 16 during manufacturing of the membrane 10 so that the adhesive substance 26 covers an area A1 of the bottom surface 16 adjacent to edge 20 as well as another area A2 of the bottom surface 16. While the adhesive substance 26 is shown as covering the area A1 directly extending all the way to edge 20, it is contemplated that a gap could be formed between the area covered by the adhesive substance 26 and edge 20. The gap can have a length extending from edge 20 that is up to 15% of the width W of the substrate 14. Such a gap can be seen adjacent to edge 22, where there is a portion 28 of the substrate 14 that is not covered by any adhesive substance 26. The portion 28, which can also be referred to as a seam line, can be free of adhesive so that it can be sewn to one or more other membranes with portions that overlap portion 28.

A first liner 30 and a second liner 32 cover the adhesive substance 26. The first liner 30 and second liner 32 cover the adhesive substance 26 to prevent the adhesive substance 26 from sticking to surfaces until the adhesive substance 26 is exposed by removing one or both of the liners 30 and 32. As shown, the first liner 30 and second liner 32 cooperatively cover all of the adhesive substance 26 on the bottom surface 16 of the substrate 14, but this is not a necessary feature of the liners 30 and 32. The first liner 30 covers the area A1 of the adhesive substance 26 that is adjacent to the first edge 20 and extends to edge 24 and the second liner 32 covers the other area A2 of the adhesive substance 26 that is not covered by the first liner 30. The liners 30 and 32 can be formed of any material that can be temporarily adhered to the adhesive substance 26, such as a thin film of plastic. It is useful if the liners 30 and 32 are easily removable by hand from the adhesive substance 26, for reasons which will be further explained herein.

The first liner 30 and second liner 32 are independently separable from the adhesive substance 26, meaning that the first liner 30 can be fully removed from the adhesive substance 26 without fully removing the second liner 32, and vice versa. One possible way of configuring the first liner 30 and second liner 32 to be independently separable from the adhesive substance 26 is to abut ends of the first liner 30 and second liner 32 against one another or provide a relatively small gap between the liners 30 and 32. It is also contemplated that one of the liners 30 or 32 can partially overlap with the other liner 32 or 30, respectively, to cover the adhesive substance 26. The first liner 30 can have a first pull tab 34 connected thereto at an end adjacent to the second liner 32 and the second liner 32 can have a second pull tab 36 connected thereto at an end adjacent to the first liner 30. Each pull tab 34, 36 can be formed integrally with or otherwise connected to its respective liner 30, 32 so that the pull tabs 34, 36 are not adhered to the adhesive substance 26. The pull tabs 34, 36 can be pulled in a direction away from the adhesive substance 26 to separate their respective liner 30, 32 from the adhesive substance 26. It should be appreciated that this configuration is exemplary only and any configuration that allows independent separation of the liners 30, 32 from the adhesive substance 26 can be utilized.

Figure 1B:
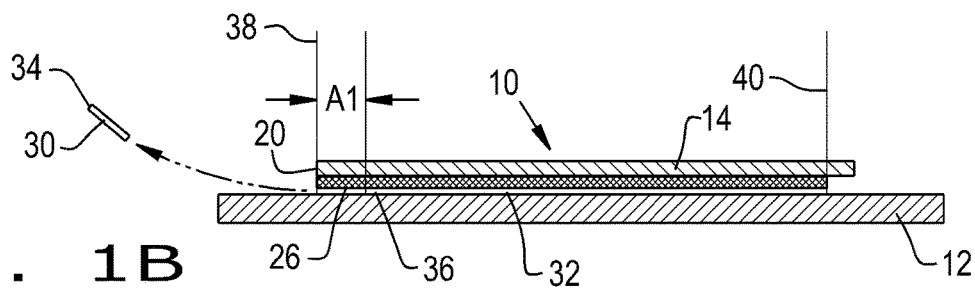
FIG. 1B is an illustration of another step of the method shown in FIG. 1A.
Figure 1C:
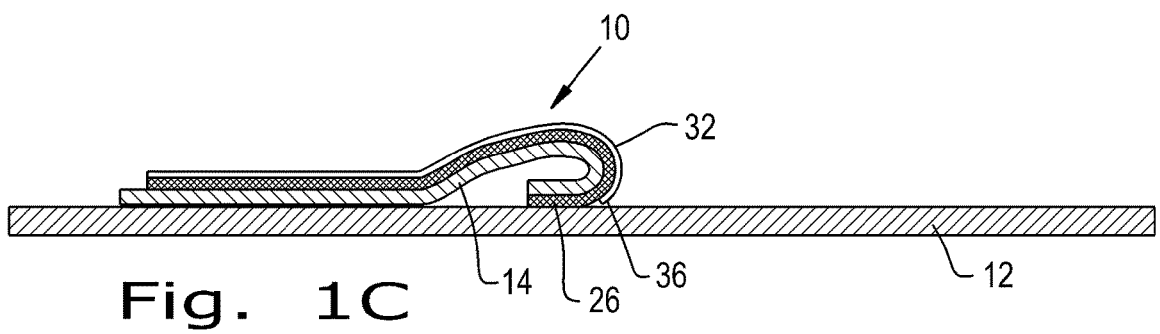
FIG. 1C is an illustration of another step of the method shown in FIGS. 1A and 1B.
Figure 1D:
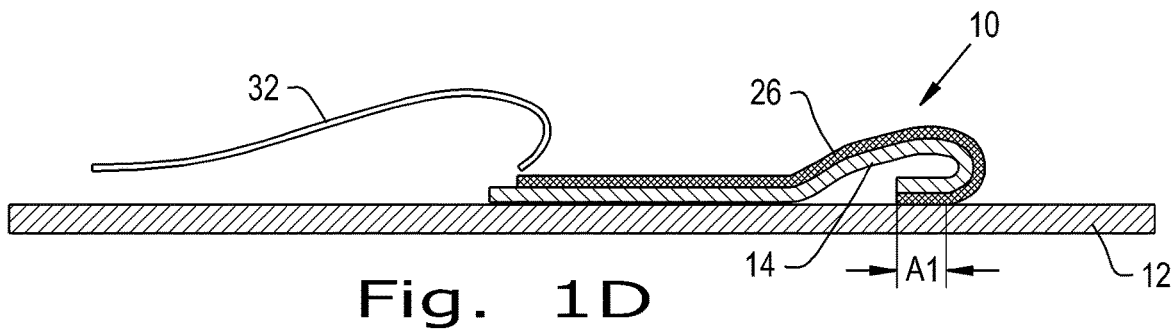
FIG. 1D is an illustration of another step of the method shown in FIGS. 1A, 1B, and 1C.
Figure 1E:
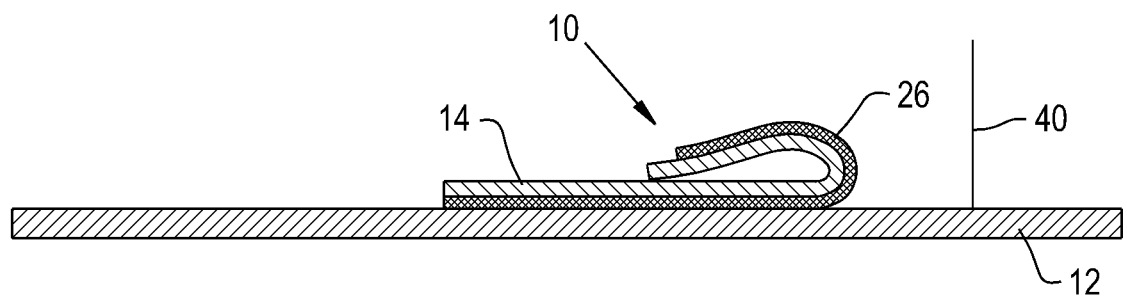
FIG. 1E is an illustration of another step of the method shown in FIGS. 1A, 1B, 1C, and 1D.
Figure 1F:
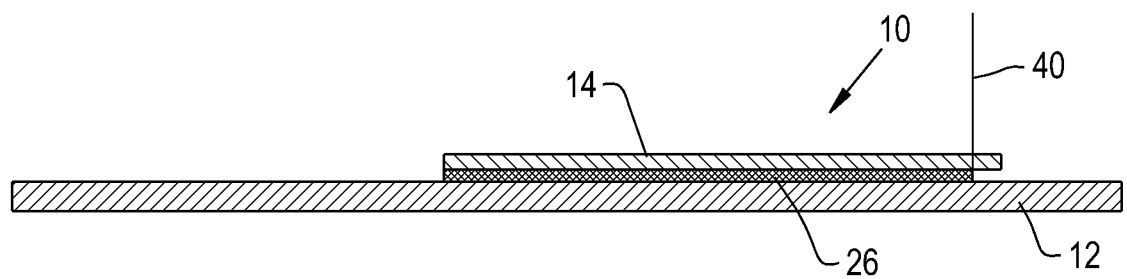
FIG. 1F is an illustration of another step of the method shown in FIGS. 1A, 1B, 1C, 1D, and 1E.

One possible method of adhering the self-adhesive membrane 10 to surface 12 according to the present invention is illustrated in FIGS. 1A, 1B, 1C, 1D, 1E, and 1F. As can be seen, lines 38 and 40 can be drawn on surface 12 to correspond to desired placement of the membrane 10. Edge 20 of the membrane 10 can be positioned so that it is aligned with line 38, and the membrane 10 laid out so that it is properly positioned on the surface 12, as shown in FIG. 1A. Once the membrane 10 is properly positioned on the surface 12, edge 20 can be slightly lifted off the surface 12 to expose the first pull tab 34 of the first liner 30 and the first pull tab 34 can be pulled to remove the first liner 30 and expose the area A1 of the adhesive substance 26 previously covered by the first liner 30, as shown in FIG. 1B. The edge 20 can then be replaced back on the surface 12 so it aligns with the line 38 and pressure can be applied to the top surface 18 over the exposed adhesive substance 26, anchoring the membrane 10 to the surface 12 using the exposed adhesive substance 26. Edge 22 can then be pulled toward line 38 until the second pull tab 36 is exposed, as shown in FIG. 1C, and the second pull tab 36 can be pulled back to completely remove the second liner 32 and expose the other area A2 of the adhesive substance 26 previously covered by the second liner 32, as shown in FIG. 1D. The top surface 18 of the substrate 14 can then be pressed toward the surface 12 in a direction toward line 40 to press the now uncovered adhesive substance 26 into the surface 12 along the width W of the substrate 14 and adhere the membrane 10 to the surface 12, as shown in FIGS. 1E and 1F.

Figure 2A:
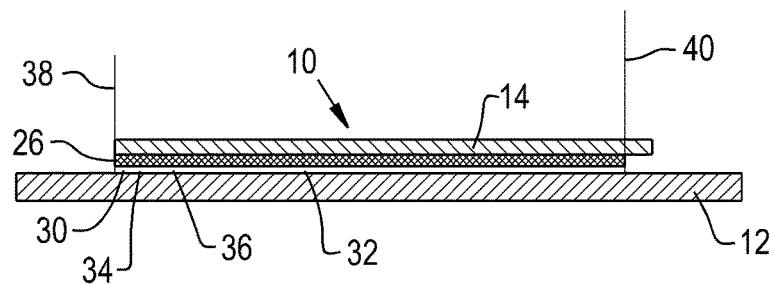
FIG. 2A is an illustration of another embodiment of a method according to the present invention for adhering a flexible membrane to a surface.
Figure 2B:
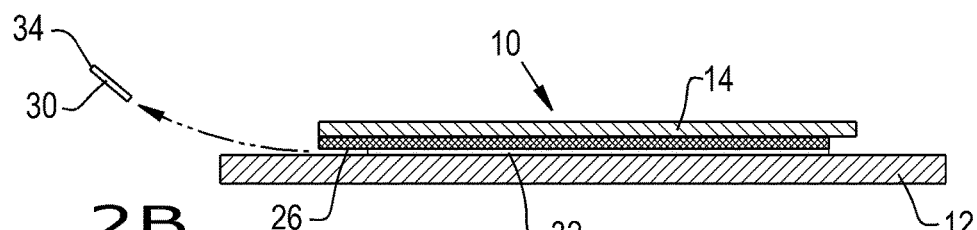
FIG. 2B is an illustration of another step of the method shown in FIG. 2A.
Figure 2C:
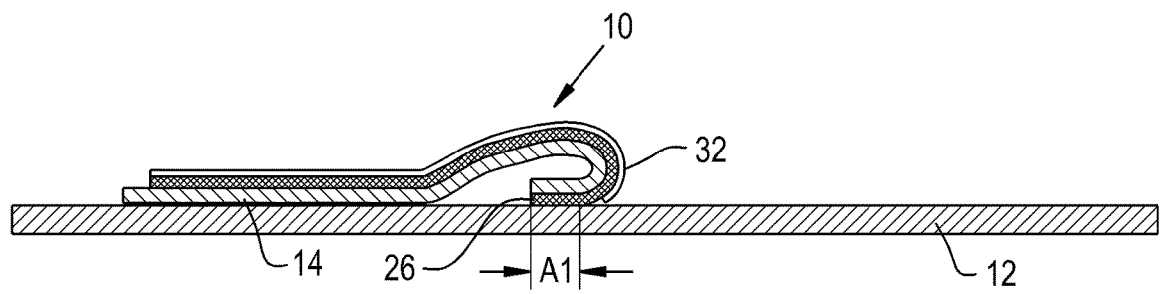
FIG. 2C is an illustration of another step of the method shown in FIGS. 2A and 2B.
Figure 2D:
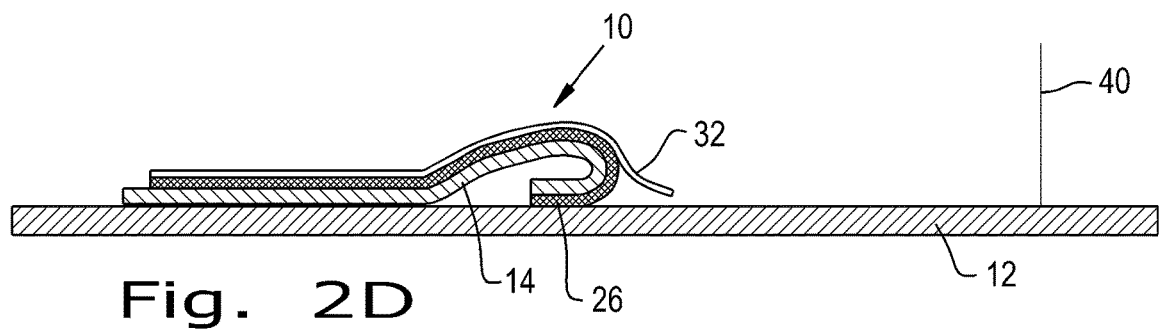
FIG. 2D is an illustration of another step of the method shown in FIGS. 2A, 2B, and 2C.
Figure 2E:
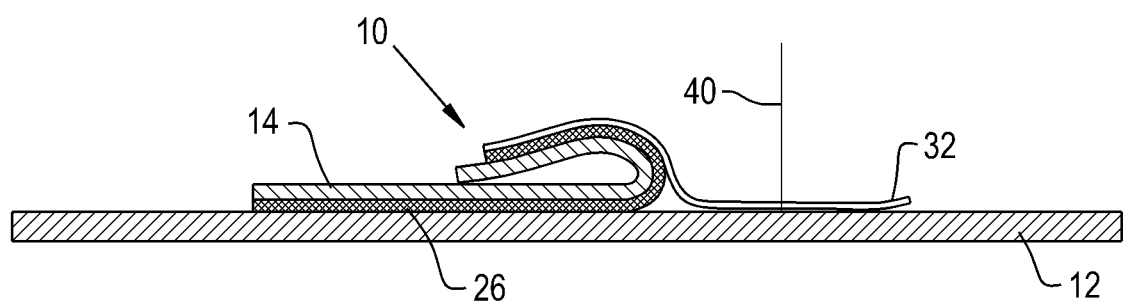
FIG. 2E is an illustration of another step of the method shown in FIGS. 2A, 2B, 2C, and 2D.
Figure 2F:
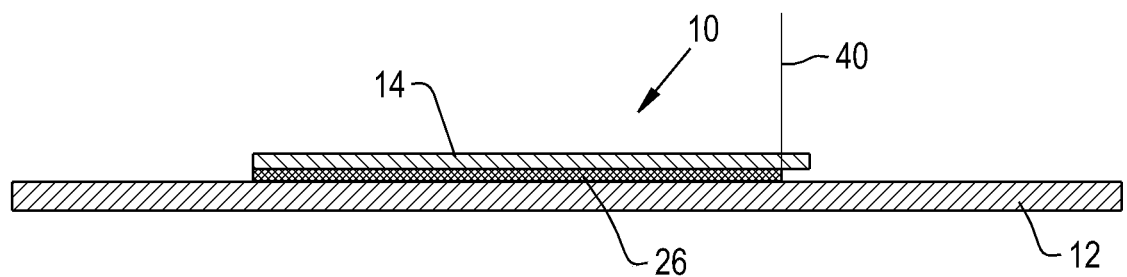
FIG. 2F is an illustration of another step of the method shown in FIGS. 2A, 2B, 2C, 2D, and 2E.
Figure 3:
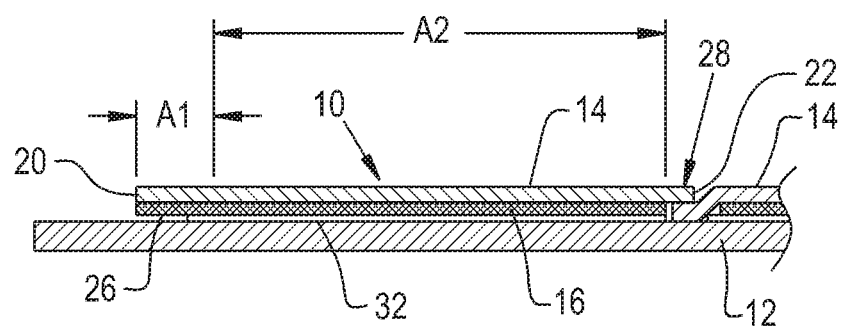
FIG. 3 is an illustration of an embodiment for affixing two flexible membranes in an overlap portion.

Another possible method of adhering the self-adhesive membrane 10 to surface 12 according to the present invention is illustrated in FIGS. 2A, 2B, 2C, 2D, 2E, and 2F. As can be seen in FIGS. 2A and 2B, the membrane 10 is anchored to the surface 12 after removing the first liner 30 in a similar manner to what is shown in FIGS. 1A and 1B. After the membrane 10 is anchored to the surface 12, the second pull tab 36 is also exposed so that the second liner 32 can be separated from the adhesive substance 26, as shown in FIG. 2C. However, rather than completely separating the second liner 32 from the adhesive substance 26 and then pressing the adhesive substance 26 into the surface 12, the second liner 32 is pulled away from the adhesive substance 26 in a direction toward line 40 so that the adhesive substance 26 uncovered as the second liner 32 separates is simultaneously pressed against the surface 12, as shown in FIGS. 2D and 2E, until the substrate 14 is completely adhered to the surface 12, as shown in FIG. 2F. The top surface 18 can be pressed as the second liner 32 is separated to further force the exposed adhesive substance 26 into the surface 12.

While this invention has been described with respect to at least one embodiment, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. A self-adhesive membrane, comprising:
   a substrate having a bottom surface, a first edge, an opposite edge, and a width;
   an adhesive substance partially covering said bottom surface, said adhesive substance covering an area of said bottom surface adjacent to said first edge, wherein a gap is formed between said opposite edge and said area covered by said adhesive substance to form a portion of said substrate that is not covered by any of said adhesive substance, said gap having a length extending from said opposite edge up to 15% of said width of said substrate, said gap providing a seam line;
   a first liner partially covering said adhesive substance, said first liner covering said area of said adhesive substance adjacent to said first edge; and
   a second liner covering another area of said adhesive substance not covered by said first liner, said second liner and said first liner being independently separable from said adhesive substance, said area of said adhesive substance covered by said first liner being less than said area of said adhesive substance covered by said second liner.

2. The self-adhesive membrane according to claim 1, wherein said substrate includes a second edge adjacent to said first edge, said first liner extending to said second edge.

3. The self-adhesive membrane according to claim 1, wherein said gap is essentially 0% of said width and said first liner and said second liner cooperatively cover said adhesive substance completely.

4. The self-adhesive membrane according to claim 1, wherein said first liner one of partially overlaps and abuts said second liner.

5. The self-adhesive membrane according to claim 1, wherein a gap is formed between said first liner and said second liner.

6. The self-adhesive membrane according to claim 1, wherein said substrate comprises at least one of thermoplastic polyolefin and ethylene propylene d terpolymer.

7. A plurality of self-adhesive membranes, comprising:
   a first self-adhesive membrane comprising a first substrate, having a first bottom surface, a first edge, a first width, a first adhesive substance at least partially covering said first bottom surface, said first adhesive substance covering a first area of said first bottom surface forming a first gap between said first edge and said first area covered by said first adhesive substance, said first gap having a first length extending from said first edge up to 15% of said first width of said first substrate;
   a second self-adhesive membrane comprising a second substrate, having a second bottom surface, a second edge, a second width, a second adhesive substance at least partially covering said second bottom surface, said second adhesive substance covering a second area of said second bottom surface forming a second gap between said second edge and said second area covered by said second adhesive substance, said second gap having a second length extending from said second edge up to 15% of said second width of said second substrate, said second gap providing a second seam line; and
   said first substrate and second substrate each including an overlap portion corresponding to said first gap and said second gap, respectively, the overlap portions of the first substrate and the second substrate sewn to each other.

8. The self-adhesive membrane according to claim 1, further comprising a first pull tab connected to said first liner and not adhered to said adhesive substance.

9. The self-adhesive membrane according to claim 8, further comprising a second pull tab connected to said second liner and not adhered to said adhesive substance.

10. The self-adhesive membrane according to claim 8, wherein the first pull tab is connected to an end of said first liner adjacent to said second liner.

* * * * *